United States Patent
Rastl

(10) Patent No.: US 9,120,386 B2
(45) Date of Patent: Sep. 1, 2015

(54) SENSOR ELEMENT FOR A SENSOR DEVICE

(75) Inventor: Hans Rastl, Bad Goisern (AT)

(73) Assignee: HOFFMANN & CO., ELEKTROKOHLE AG, Steeg (AT)

( * ) Notice: Subject to any disclaimer, the term of this patent is extended or adjusted under 35 U.S.C. 154(b) by 217 days.

(21) Appl. No.: 13/514,188

(22) PCT Filed: Nov. 12, 2010

(86) PCT No.: PCT/EP2010/067358
§ 371 (c)(1),
(2), (4) Date: Aug. 3, 2012

(87) PCT Pub. No.: WO2011/069776
PCT Pub. Date: Jun. 16, 2011

(65) Prior Publication Data
US 2012/0305357 A1    Dec. 6, 2012

(30) Foreign Application Priority Data
Dec. 9, 2009   (DE) ................. 10 2009 047 757

(51) Int. Cl.
*B60L 5/20*    (2006.01)

(52) U.S. Cl.
CPC ............. *B60L 5/205* (2013.01); *B60L 2200/26* (2013.01)

(58) Field of Classification Search
CPC ........ B60L 5/20; B60L 5/205; B60L 2200/26
USPC ......... 191/33 R, 59.1, 87; 340/626; 73/37, 40
See application file for complete search history.

(56) References Cited

U.S. PATENT DOCUMENTS

| 5,176,230 A | 1/1993 | Odot | |
| 5,969,233 A * | 10/1999 | Basche et al. | 73/37 |
| 5,992,900 A * | 11/1999 | Heller | 285/114 |

FOREIGN PATENT DOCUMENTS

| CN | 1032584 A | 4/1989 |
| CN | 2799313 Y | 7/2006 |
| DE | 688 290 | 2/1940 |
| DE | 38 17 743 | 3/1990 |
| DE | 4425460 A1 | 1/1996 |
| EP | 0078159 A1 | 5/1983 |
| EP | 0872374 | 10/1998 |
| EP | 1366947 | 12/2003 |
| GB | 2 107 662 | 5/1983 |
| JP | H04271202 A | 9/1992 |
| JP | H0584026 U | 11/1993 |
| JP | H10304505 A | 11/1998 |
| JP | H11213978 A | 8/1999 |

(Continued)

OTHER PUBLICATIONS

Korean document—KR100369289, Jan. 24, 2003, abstract page and drawing page.*

(Continued)

*Primary Examiner* — Mark Le
(74) *Attorney, Agent, or Firm* — Quarles & Brady LLP

(57) ABSTRACT

A sensor element for a sensor device and a carbon collector includes a sensor element, in particular for energy transfer from a contact wire to a vehicle. The sensor element is formed from a fluid-sealed tube profile which can be arranged in a longitudinal recess of a carbon collector, wherein there is at least one predetermined breaking point designed on the tube profile.

10 Claims, 3 Drawing Sheets sensor having at least one predetermined breaking point formed in the tube profile in the form of a helix

(56) References Cited

FOREIGN PATENT DOCUMENTS

| JP | 2001237109 A | 8/2001 |
|---|---|---|
| WO | 90/13453 | 11/1990 |

OTHER PUBLICATIONS

Japan Patent Office, Notice of Reasons for Rejection (English Translation), Application No. 2012-542426, Jul. 30, 2013, pp. 1-6.
Englisn translation of the International Preliminary Report on Patentability as mailed on Jun. 21, 2012 for International Application No. PCT/EP2010/067358.
International Search Report as mailed on Feb. 29, 2012 for International Application No. PCT/EP2010/067358.
State Intellectual Property Office of People'S Republic of China, First Office Action, Application No. 201080055890.6, Mar. 31, 2014, 7 pages [English Language Translation Only].
Patent Office of the People'S Republic of China, Search Report, Application No. 201080055890.6, Mar. 21, 2014, 2 pages [English Language Translation Only].

\* cited by examiner

18 sensor having at least one predetermined breaking point formed in the tube profile in the form of a helix

Fig. 5

SENSOR ELEMENT FOR A SENSOR DEVICE

CROSS-REFERENCE TO RELATED APPLICATIONS

This application represents the national stage entry of PCT International Application No. PCT/EP2010/067358 filed on Nov. 12, 2010 and claims the benefit of German Patent Application No. DE 10 2009 047 757.8 filed Dec. 9, 2009. The contents of both of these applications are hereby incorporated by reference as if set forth in their entirety herein.

STATEMENT REGARDING FEDERALLY SPONSORED RESEARCH OR DEVELOPMENT

Not applicable.

FIELD OF THE INVENTION

The invention relates to a sensor element for a sensor device, in particular for carbon collectors for energy transfer from a catenary wire to a vehicle, as well as a carbon collector with a sensor element, wherein the sensor element is formed by a fluid-sealed tube profile which can be arranged in a longitudinal recess of a carbon collector.

BACKGROUND OF THE INVENTION

Carbon collectors are regularly also used as a so-called sliding strip for energy transfer from a catenary wire to a vehicle, such as for example a locomotive. In the presence of severe wear or damage to the carbon collector, considerable damage to the catenary wire or an overhead line can occur, amongst other things. Locomotives are therefore regularly equipped with a sensor device, which brings about a lowering of the sliding strip with the carbon collector or a pantograph when a certain wear limit of the carbon collector is exceeded or damage occurs to the carbon collector. The sensor device comprises a sensor element which can be constituted as a fluid-sealed channel or as a tube profile in the carbon collector, wherein the sensor element is acted upon by compressed air. When the wear limit is reached, the channel or the tube profile start to be ground and compressed air escapes. The pressure loss is detected by the sensor device, after which a lowering of the pantograph takes place.

In some cases, use is made in carbon collectors of stable tube profiles which are inserted in a longitudinal recess on the underside of or inside the carbon collector. The problem arises here that a tube profile, constituted for example by a metal tube, is not reliably damaged, i.e. triggering of the sensor device and lowering of the pantograph is not brought about in all envisaged cases. If, for example, pieces of carbon break out from the carbon collector caused by a fault in the catenary wire, the tube profile may be exposed and in some cases severely deformed. Especially in the case of sufficiently elastic and metallic tube profiles, this deformation does not necessarily lead to direct damage to a tube profile wall that could produce an escape of compressed air. In order to avoid damage to overhead lines, however, it is necessary for the pantograph to be lowered immediately after such damage to the carbon collector.

The problem underlying the present invention, therefore, is to propose a sensor element or a carbon collector with a sensor element, which produces an improved response of a sensor device in the event of damage to the carbon collector.

SUMMARY OF THE INVENTION

The sensor element according to the invention for a sensor device, in particular for carbon collectors for energy transfer from a catenary wire to a vehicle, is formed from a fluid-sealed tube profile, which can be arranged in a longitudinal recess of a carbon collector, wherein at least one predetermined breaking point is formed on the tube profile.

A deformation of the tube profile without an escape of compressed air from the tube profile, such as can occur in the case of serious damage to a carbon collector, causes a tensile and/or bending load on the tube profile. The predetermined breaking point on the tube profile is constituted such that it can react to such loads and an opening of a tube profile wall at the predetermined breaking point is produced quickly and reliably, at which compressed air can flow out of the tube profile. In principle, the material from which the tube profile is made or the cross-sectional shape with which the tube profile is formed is unimportant. Accordingly, the tube profile can also have a round, polygonal or oval cross-section.

In an embodiment, the predetermined breaking point can be formed by a wall thickness of an otherwise uniform tube profile wall that is reduced at the predetermined breaking point. That is to say that the tube profile wall can comprise a weakened point which, on account of the reduced wall thickness at this point, produces a sufficiently large opening of the tube profile wall, for example in the presence of a tensile load or bending of the tube profile.

It is particularly advantageous if a plurality of predetermined breaking points is formed along a longitudinal extension of the tube profile. The probability that a predetermined breaking point will lie in a region of an expected break of a carbon collector is thus significantly increased compared to a tube profile with a single predetermined breaking point.

The predetermined breaking points can also be spaced apart from one another in a regular manner. For example, the predetermined breaking points can be formed at equal distances on the tube profile, wherein the distances can be selected in order to ensure that, in the event of pieces of carbon breaking out from the carbon collector, a predetermined breaking point lies in the immediate vicinity of the damage.

The predetermined breaking point can easily be produced if it is formed on an external side of the tube profile. The tube profile can then be partially weakened particularly easily by removal of material.

In an embodiment, the predetermined breaking point can be constituted in the form of a helix, such as shown in FIG. 5. For example, spirally or thread-shaped, single-threaded or multiple-threaded, also in different gradients or in opposite directions.

The predetermined breaking point can also be formed in the transverse direction of the tube profile. For example, a partial weakening of the tube profile can then be produced by drawing the tube profile section by section.

Furthermore, the predetermined breaking point can be formed as a peripheral groove. A peripheral groove is particularly easy to produce, for example by removal of material by turning, milling, grinding, striking, etching, laser processing etc. or by notching a tube profile surface by means of rolling, pressing, knurling, stamping, stretching, upsetting etc. In cross-section, the groove can be formed rectangular, triangular, trapezoidal, Y-shaped or x-shaped, on the external side and/or internal side of the tube profile.

The tube profile can be constituted at least partially as a corrugated tube. For example, continuously or in sections in the manner of a bellows or as a so-called folded tube.

Alternatively, the predetermined breaking point can be formed in the longitudinal direction of the tube profile, for example by one or more reductions in the wall thickness in the longitudinal direction of the tube profile. The predetermined breaking points in the longitudinal direction can be combined with predetermined breaking points in the transverse direction or can be formed on their own on the tube profile.

Apart from the formation of the tube profile from a plastic material, the tube profile can also be constituted by a metal tube. The metal tube can preferably be made of copper.

The tube profile can be produced particularly cost-effectively and easily if the tube profile is formed with a round cross-section. Such tube profiles can easily be obtained as semi-finished products, the predetermined breaking point then merely having to be formed on the tube profile.

The carbon collector according to the invention, in particular for energy transfer from a catenary wire to a vehicle, comprises an inventive sensor element described herein, wherein a predetermined breaking point of the sensor element is arranged inside a sliding contact section A of the carbon collector. An immediate activation of the sensor element is thus promoted in the event of damage to the carbon collector caused by a catenary wire. Further advantageous embodiments of a carbon collector are also described herein.

BRIEF DESCRIPTION OF THE DRAWINGS

The invention will be explained in greater detail below by reference to the appended drawings.

In the figures:

FIG. 5 shows a representation of an alternative sensor.

DETAILED DESCRIPTION OF THE EXAMPLE EMBODIMENTS

Figure 1:
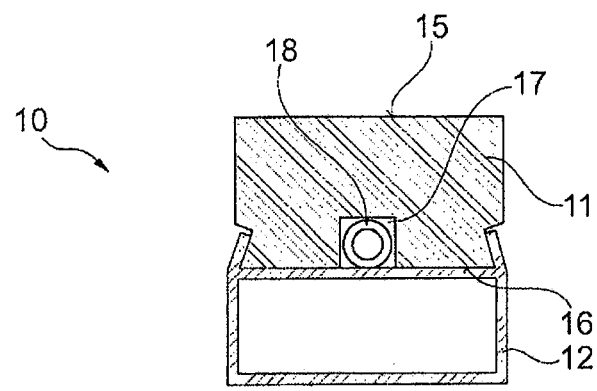
FIG. 1: shows a cross-sectional view of a sliding strip along a line I-I from FIG. 4 in a diagrammatic representation.
Figure 4:
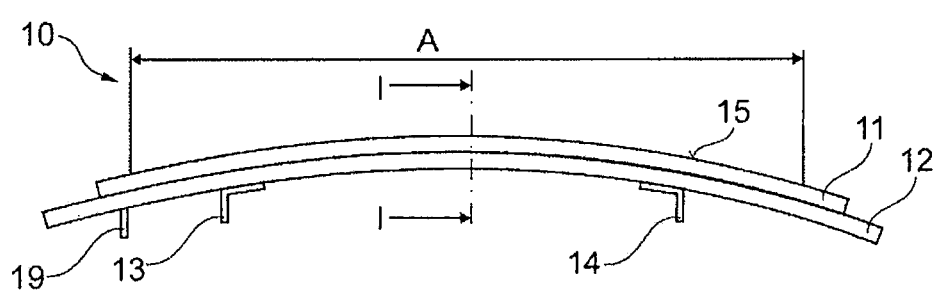
FIG. 4: shows a side view of a sliding strip in a diagrammatic representation

FIG. 1 shows a cross-sectional view of a sliding strip 10 from FIG. 4, wherein sliding strip 10 is essentially constituted by a carbon collector 11 and a supporting profile 12. Sliding strip 10 is secured by means of fixing brackets 13 and 14 to a pantograph not represented here, so that, in a sliding contact section A, a catenary wire, likewise not represented, can be contacted on a sliding contact surface 15 of carbon collector 11 for the transfer of electrical energy. Formed in an underside 16 of carbon collector 11, furthermore, is a longitudinal recess 17 into which a tube profile 18 is inserted. Tube profile 18 is connected by means of a connection line 19 to a sensor device of a locomotive, not shown here. Compressed air flows out of tube profile 18 in the presence of an opening or a perforation of a tube profile wall 20 of tube profile 18, as a result of which the sensor device brings about a lowering of the pantograph with sliding strip 10 and thus a separation from the catenary wire.

Figure 2:
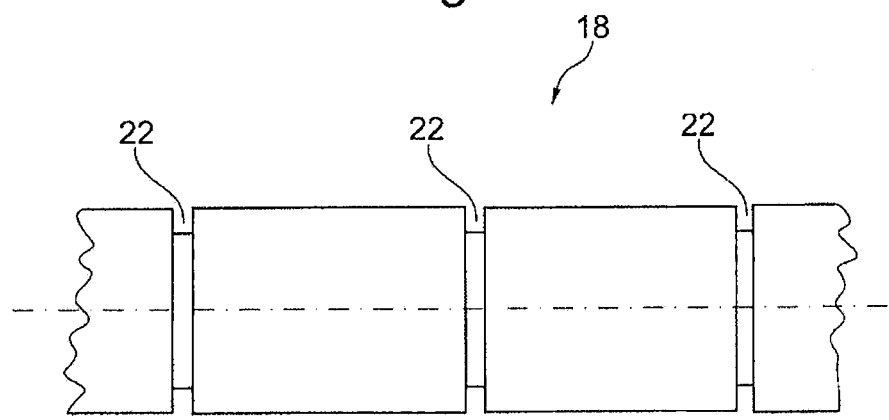
FIG. 2: shows in sections a side view of a tube profile.
Figure 3:
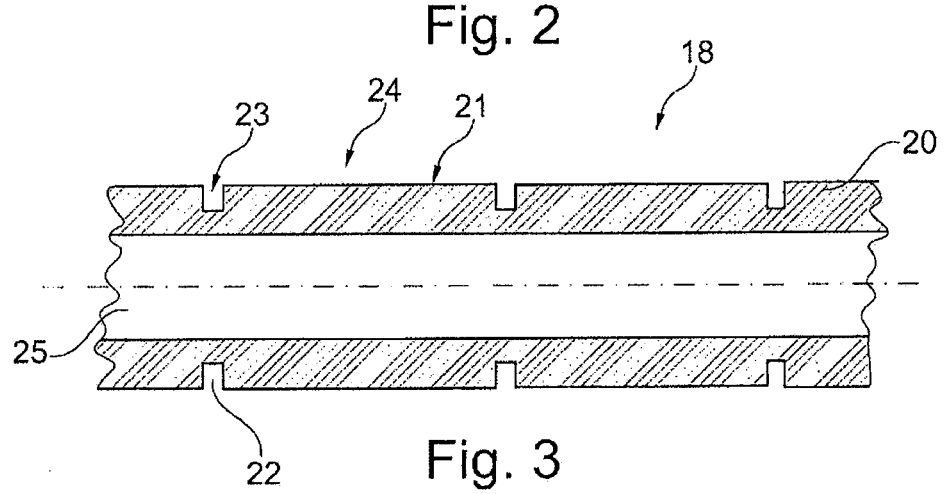
FIG. 3: shows the tube profile from FIG. 2 in a longitudinal cross-sectional view.

As can be seen from FIGS. 2 and 3, peripheral grooves 22 are formed in tube profile 18, in particular at its external side 21, and are arranged at equal relative distances along a longitudinal extension of tube profile 18. Grooves 22 each form predetermined breaking points, since tube profile wall 20 has a reduced wall thickness in a wall section 23 of groove 22 compared with a regular wall section 24 of tube profile wall 20. A tensile or bending load on tube profile 18 thus causes a break or an opening of tube profile wall 20 in the region of groove 22. This is particularly advantageous, since tube profile 18 is made from comparatively elastic copper in the case described. Compressed air present in an interior space 25 of tube profile 18 can easily escape from the latter in the case of such damage to tube profile 18. The peripheral formation of groove 22, in particular, promotes a complete perforation of tube profile 18 and therefore a rapid escape of the compressed air, which produces a rapid response of the sensor device compared to a narrow crack.

In order to guarantee a reliable function of the sensor device at every contact position of the catenary wire on carbon collector 11 or sliding contact surface 15, grooves 22 are distributed or arranged along entire sliding contact section A over the longitudinal extension of tube profile 18.

The invention claimed is:

1. A carbon collector for energy transfer from a catenary wire to a vehicle, said carbon collector comprising:
a sensor element including a fluid-sealed tube profile arranged in a longitudinal recess of the carbon collector, said sensor element having at least one predetermined breaking point formed in the tube profile in the form of a helix, wherein the at least one predetermined breaking point of the sensor element is arranged inside a sliding contact section (A) of the carbon collector.

2. The carbon collector according to claim 1, in which the at least one predetermined breaking point is formed by a wall thickness of a uniform tube profile wall—that is reduced at the predetermined breaking point.

3. The carbon collector according to claim 1, in which a plurality of predetermined breaking points are formed along a longitudinal extension of the tube profile.

4. The carbon collector according to claim 3, in which the plurality of predetermined breaking points are spaced apart from one another in a regular manner.

5. The carbon collector according to claim 1, in which the at least one predetermined breaking point is formed on an external side of the tube profile.

6. The carbon collector according to claim 1, in which the at least one predetermined breaking point is formed in a transverse direction of the tube profile.

7. The carbon collector according to claim 1, in which the predetermined breaking point is formed as a peripheral groove.

8. The carbon collector according to claim 1, in which the at least one predetermined breaking point is formed in a longitudinal direction of the tube profile.

9. The carbon collector according to claim 1, in which the tube profile-is constituted by a metal tube.

10. The carbon collector according to claim 1, in which the tube profile-is formed with a round cross-section.

\* \* \* \* \*